Aug. 18, 1970     H. W. BRESSER     3,524,471
PROGRAMMED CENTRAL CONTROL GREENHOUSE IRRIGATION SYSTEM
Filed April 24, 1968
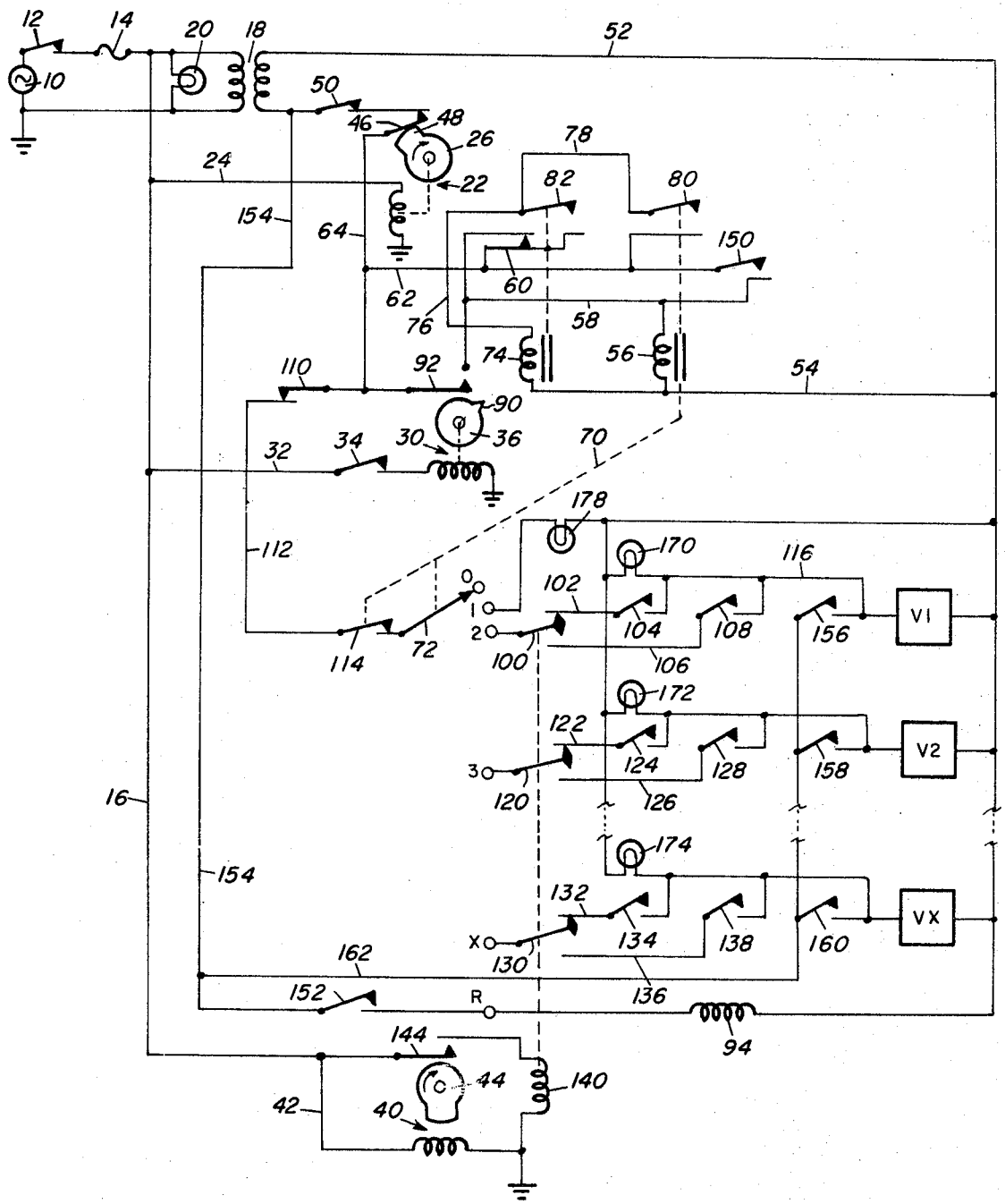
INVENTOR
HENRY W. BRESSER
BY Beale and Jones
ATTORNEYS

United States Patent Office 3,524,471
Patented Aug. 18, 1970

3,524,471
PROGRAMMED CENTRAL CONTROL GREENHOUSE IRRIGATION SYSTEM
Henry W. Bresser, 211 S. 12th St.,
Muskogee, Okla. 74401
Filed Apr. 24, 1968, Ser. No. 723,809
Int. Cl. G05d 7/06
U.S. Cl. 137—624.12
12 Claims

ABSTRACT OF THE DISCLOSURE

An automatic watering system for greenhouses utilizing a plurality of solenoid valve watering circuits is provided. Stepping switch means are utilized to advance the system from one watering circuit to the next in accordance with a predetermined timing program. Two or more watering programs may be set into the system, with the system following one program during a first cycle of operation, and automatically shifting to another program in a subsequent cycle. A pulsing source steps the system from one watering circuit to the next thus controlling the duration of energization of each circuit within each preset program, variations in the pulsing intervals and the plurality of watering programs providing a wide variety of options which may be chosen to meet the conditions required by the particular crop being grown.

BACKGROUND OF THE INVENTION

The present invention relates to a greenhouse pot plant irrigation control system and, more particularly, relates to a system for controlling the application of water and plant nutrients in proper proportion and at appropriate times in a greenhouse environment. The system permits a rigorous control of a watering program which is not available with prior mechanisms which are directed to lawn sprinkling and the like and which thus are not suitable for the exacting demands of pot plant watering.

The use of nutrients by plants is closely correlated to their use of water, and the development of practical machines for injecting fertilizer solutions into water supply lines makes this an ideal way of supplying nutrients to plants at each watering. The advantage of this steady, controlled supply of nutrients reflects itself in far better growth of plants, and therefore this practice is now almost universally accepted in the industry.

Upon the development of such fertilization practices, irrigation systems for potted plants were developed to take advantage of these practices. These systems consist of small diameter plastic tubes connected to a central water main, the plastic tubes which lead to each pot being engineered to supply exactly the same amount of water to each pot at each watering. This constant supply of water not only provides the best way of utilizing the continuous fertilization methods, but results in greater reliability in plant quality. This type of watering leads to the evolution of hydroponic methods of growing, or of semi-hydroponic methods where some soil is used, and with these latter methods, exact proportioning and watering control becomes increasingly important.

Two major limitations exist in automatic watering systems. The first is the limited capacity of available water lines to carry the relatively large volumes of water necessary to supply large numbers of plants at the same time. Of course, if only water flow were to be a consideration, it would only be necessary to increase the size of the water mains in order to retain working pressure when several valves are open at the same time. However, there is a second limitation which must be taken into account, and this is the most important. Fertilizer injection pumps are only capable of introducing a given amount of fertilizer into the water flow, and overloading of the injector pump will decrease the amount of fertilizer injected per gallon. Although large pumps are available at a proportionately larger cost, most greenhouses use smaller pumps since various fertilizers are used for various crops. Further, for each large operator who can afford a larger pump, there are hundreds of smaller operators who need controls for smaller pumps.

The foregoing limitations are not taken into consideration by the irrigation controls now on the market. The controls which have been developed are varied, but they may be classified in three categories: (1) manual; (2) scale or other weight control; and (3) time clocks. All of these controls are useful and produce good results within the limited scope of their operation, but they do not satisfy the requirements of newer methods, nor do they permit central control of the operation.

The manual type of operation requires a man to turn each valve on, wait for the proper amount of water to pass through, then turn it off and move to the next station. This presents a serious manpower problem in small greenhouse operations where economy of operation is essential if there is to be a profit.

There are two types of scale controls which are presently available. One type requires a manual turn-on and then turns itself off at a pre-set quantity, by weight. This type of control is not a great improvement over the completely manual operation, for a man must decide, or be told, when to turn the system on, and then wait until the cycle is complete before turning on the next station. Some weight controls are provided which are designed to turn themselves on and off. Since dry soil weighs less than soil saturated with water, at a pre-set minimum weight, a microswitch associated with a pot can be tripped to operate a solenoid valve which will stay on until a pre-set heavier weight of the pot is reached due to water saturating the soil, at which time the valve is cut off. This method can produce high quality plants because the moisture level is maintained and no human error enters, assuming the proper changing of the scale as the plant grows. But the hydraulic limitations mentioned above reduce the effectiveness of this type of operation, for if two or more of these mechanisms turn on their associated solenoid valves at the same time, then the injector pump is overloaded and the proper amount of fertilizer is not applied. Such an operation is very probable, since most plants which are in the same soil mixture and which are located in similar atmospheric conditions will dry out at about the same time. When this overloading occurs, a lowering instead of an increase in quality of the plants is the result.

The time clock method of operating a watering circuit turns a solenoid valve on at a given time of day and regulates the duration of the on period. A throttle valve generally is provided to allow a certain amount of water to pass into the system when it is on. The time clock may be set to come on one or two times a day, depending upon the season, but with the use of several stations, i.e., 30 or more in larger operations, it is impossible to obtain sufficiently close synchronization to give proper control without overlap. Where there is overlap, the hydraulic problems mentioned above reduce the efficiency and dependability of the system. Also, with most systems presently available, the minimum available on time is about 15 minutes, and for many applications this is unacceptably long.

Thus, it will be apparent that the prior art devices and system do not provide for the latitude of operation necessary for synchronized, preprogrammed automatic control, and such control is not only desirable, but is fast becoming an absolute necessity in the total environmental control conditions of present day greenhouse operation. The present invention provides this control and has produced exceptional results in tests in a large greenhouse operation. The device of the present invention is technically capable of performing the exacting watering operations described above, yet is simple enough for an average greenhouse employee to operate. In all instances where this invention has been tested, the quality improvement has been marked.

SUMMARY OF THE INVENTION

In order to carry out the delicate and precise timing required for effective plant biology, the present invention provides an automatic system which includes a first timer motor which initiates a watering cycle by supplying an on pulse. This pulse is applied to the master coil of a stepper relay, releasing the reset switch on the stepper to permit energization of a watering timer motor. The first timer is then disconnected from the master coil and the system operates under the control of the watering timer motor which produces periodic pulses through the main coil of the stepper. Each energization of the stepper coil operates the stepper switch to the next in a series of contacts, each contact leading to a different watering circuit. During the time that the stepper switch rests on a given contact, a corresponding valve solenoid is energized to permit the flow of water and fertilizer to the particular plants irrigated by that circuit. When the stepper contact reaches its last position, a reset coil is energized, the circuit through the stepper switch contact is opened, and the stepper arm is returned to its initial position. At the same time, the reset switch to the watering timer motor is opened and latched open, bringing the system to rest until the stepper coil is again energized either by the first timer turning off and then on again or by a manually operated override switch.

The stepper is provided with an auxiliary relay coil operating as a "make before break" continuity transfer switch to limit the length of time the starting current from the first timer is applied to the step coil, thus permitting the watering timer motor to assume control of the system more quickly. The system is provided with two or more watering programs which may automatically be selected by a second timer motor which is synchronized with the first timer described above. The second is energized at the same time the system is energized, but, in one embodiment, has no effect until the stepper has completed a first cycle and has reset itself, and the first timer motor has turned off. Then the second timer motor operates to change the valve energization program so that upon re-energization of the stepper by the first timer motor for a second cycle, a different watering program will be followed. This second cycle of operation may be produced by either a second revolution of the first timer motor, or by additional camming contacts which serve to re-energize the stepper. Upon completion of the second cycle, the stepper again resets, the second timer motor permits the program to return to its initial condition, or steps it to a third program, and the system is ready for another cycle. By adjusting the first and second timers and, concurrently, the speed with which the stepper is driven through its cycle, any desired number of different watering programs can be automatically operated.

Each valve solenoid circuit includes a plurality of program switches which may be manually set to determine whether the corresponding valve solenoid will be energized during a particular cycle of operation. By reason of this circuit construction, the present invention permits a number of entirely separate programs to be preselected at the discretion of the operator. The programs can be easily changed at a central control location and thereby permit the wide latitude of operation required for greenhouse operations. The system is not limited to one or two cycles a day, but can provide as many cycles as needed within the total time limit of a day. On the other hand, if the growing conditions warrant, the number of cycles can be reduced through the use of known devices such as omit wheels on the various timers so that there is one cycle every other day or once in three days or whatever time delay period is desired. The present invention also utilizes a reset interrupter switch and a selection interrupter switch in conjunction with the stepper to open the circuit through the stepper contact arm while the unit is being reset and while it is moving from one contact to another. This action permits the stepper to make or break higher current loads than the normal rating of the stepper, for the reset interrupter and selection interrupter switches carry any arc currents and thus completely eliminate arcing between the contactor arm and the deck contacts of the stepper.

BRIEF DESCRIPTION OF THE DRAWING

The foregoing and additional objects, features and advantages of the invention will be apparent from the following detailed description of a preferred embodiment thereof, selected for the purpose of illustration and shown in the accompanying drawing, which is a schematic circuit diagram of a preferred embodiment of the invention.

DESCRIPTION OF A PREFERRED EMBODIMENT

Referring now to the drawing, a control system in accordance with the present invention is energized from a source of alternating current 10 through a master on-off switch 12 and suitable fusing means 14. The various timing devices used in the system are energized from line 16, while the numerous relays and solenoid valves controlled thereby are supplied by way of a transformer 18 which, preferably, reduces the 115 volt supply to approximately 24 volts. An indicator lamp 20 is connected across the primary of transformer 18 to indicate energization of the system.

In the illustrated embodiment, three timer motors are energized from line 16. A master timer motor, generally indicated at 22, is energized through line 24. The timer motor drives a timing cam 26, which controls the cyclic operation of the overall system, as will be described hereinbelow.

A pulsing timer motor is generally indicated at 30. This motor is energized from line 16 by way of line 32 and a normally closed latching switch 34. Timer motor 30 drives a watering circuit cam 36 which serves to produce a string of timed pulses to drive the system through its predetermined watering program.

The third motor energized by line 16 is program timer 40, connected to line 16 by way of line 42. Program timer 40 drives a program switching cam 44 which operates to shift the valve solenoid energization circuits from one preselected watering program to another preselected program.

Master timer 22 initiates each watering cycle through the closure of timing switch 46 by rotation of cam 26. Although cam 26 is shown with a single shoulder portion 48 which serves to close switch 46 and hold it closed for a predetermined period of time, various modifications of cam 26 may be used. For example, a preferred type of master timer utilizes a pair of adjustable camming tabs on a rotating disc in combination with a two-position latching switch, whereby the first tab closes the latching switch and it remains closed until the second tab unlatches it. The illustrated embodiment is used merely to disclose the type of operation required of cam 26. The duration of a cycle is determined by the length of time during which switch 46 remains closed and the repetition time by the length of time switch 46 remains open. These times may be varied by changing the size or number of shoulder portions on the cam, or the number and spacing of cam tabs on a disc or by varying the speed of rotation of cam 26. In one embodiment, master timer 22 may be adjusted to rotate once in twelve hours, thus providing two cycles of operation each day.

Connected in series between timing switch 46 and the secondary of transformer 18 is an automatic circuit control switch 50 which permits manual de-energization of the control circuitry even with the on-off switch 12 closed. De-energization of the control circuitry permits operation of the three timer motors without operation of the control circuits or the valve solenoids, thus permitting testing and adjustment of the timers without affecting the plant watering program.

Closure of timing switch 46 completes a circuit from the secondary of step-down transformer 18 through line 52, and line 54 to the main energization coil, or master coil 56 of an electrical reset stepping relay. From coil 56 the circuit continues through a line 58 to the normally closed contact 60 of a make-before-break relay and thence through lines 62 and 64 back to timing switch 46. Closure of this circuit energizes master coil 56 to operate by way of a mechanical connection, indicated diagrammatically at 70, a stepper arm 72 which makes a single step from one to the next of its bridging contacts upon each energization of the coil. Since the described circuit for master coil 56 would maintain energization of this coil for the duration of the closure of timing switch 46, and thus would prevent the stepping of arm 72, means are provided to de-energize the master stepper coil. This is accomplished by means of an auxiliary coil 74 which, upon closure of switch 46, is energized by way of line 52, line 54, coil 74, line 76, line 78 and normally open transfer switch 80, which is closed upon energization of master coil 56. Closure of switch 80 completes the circuit for the auxiliary coil 74 through lines 62 and 64 thence back to the transformer 18. Energization of auxiliary coil 74 closes make-before-break switch contact 82, which contact remains closed for the duration of energization of auxiliary coil 74. After contact 82 closes, auxiliary coil 74 opens contact 60 to de-energize master coil 56. Switch 80 also opens at this time.

Make-before-break contact 82 provides a holding circuit for auxiliary coil 74 which may be traced from coil 74, through line 76, contacts 82, lines 62 and 64 and thence to the secondary of transformer 18. De-energization of the auxiliary coil is accomplished by the opening of timing switch 46 at the end of a cycle or by the opening of switch 50.

The first energization of master coil 56 upon closure of timing switch 46 moves stepper arm 72 from the zero contact to the position 1. This does not serve to energize any circuits, but it does serve mechanically to release latching switch 34, which is a normally closed switch that is latched open by the reset mechanism of the stepper relay. This closure of latching switch 34 energizes pulsing timer 30, initiating rotation of watering circuit cam 36 and transferring control of the master stepping relay to the pulser. This cam carries at least one raised shoulder portion 90 which serves to close and open pulsing switch 92. Momentary closure of switch 92 completes a circuit from the secondary of transformer 18 through lines 52 and 54, through the main coil 56 of the stepping relay, through line 58, switch 92, line 64, contact 46, switch 50 and back to transformer 18. The resultant momentary energization of master coil 56 causes stepping arm 72 to move from position 1 to position 2, with subsequent pulses through contact switch 92 causing stepper arm 72 to move sequentially through its corresponding contacts, thus driving the system to energize sequentially the various watering circuits in accordance with a predetermined watering program. The stepping rate is controlled by the pulsing timer 30, either by regulating the rotational speed of cam 36 or by providing a plurality of camming shoulders or tabs to close the switch 92 a plurality of times for each revolution of the cam.

When the stepping arm 72 has completed its program, it reaches a reset contact R which energizes a reset coil 94 to return the stepping relay to its initial condition, with its relay arm 72 at the zero position and contact 34 latched open. Thereafter, cam 26 opens timing switch 46, de-energizing auxiliary coil 74 and ending the cycle of operation.

Any number of watering circuits may be provided, depending upon the number of contacts carried by the particular stepping relay utilized in the system. A typical watering circuit is illustrated in conjunction with position 2 of the stepper arm 72, and includes a valve solenoid V1 for a watering and fertilizing network of the type described in the introduction hereinabove, but not shown. The watering circuit associated with position 2 of the stepper arm includes a program selector switch 100 which, in the illustrated embodiment, may be used to switch the watering circuit between a first and a second watering program. Thus, when the selector switch is in the upper position, as shown, it is connected through line 102 to a first program control switch 104. When the program selector switch is in the lower position, it is connected through line 106 to a second program control switch 108. Switches 104 and 108 may be manually set to permit selective operation of solenoid valve V1 when stepper arm 72 reaches position 2. Thus, if selector switch 100 is in the upper position and switch 104 is closed, valve V1 will be energized when stepper arm 72 reaches position 2. Similarly, selector 72 will energize valve V1 if the program selector switch 100 is in the lower position and program control switch 108 is closed. The energization circuit for V1 may be traced from transformer 18 through timing switch 46, line 64, a normally closed wipe-back switch 110 associated with the reset coil 94, line 112, normally closed selection interrupter switch 114 associated with the main stepping coil 56, arm 72, contact 2, program selector switch 100, program control switch 104 or 108, line 116, solenoid V1 and line 52 back to the transformer 18. In similar manner, position 3 of the stepping relay includes a program selector switch 120 which may be connected through line 122 and contact 124 to solenoid valve V2 or through line 126 and program control switch 128 to solenoid V2.

Any number of contact positions may be utilized in the stepping relay, the particular number used depending upon the number of watering circuits in a particular operation. Thus, the contact labeled X leads to the program selector switch 130 which serves to energize the last solenoid valve VX in the sequence. Again, program selector switch 130 has alternative paths for energizing VX, either through line 132 and program control switch 134 or through line 136 and program control switch 138.

As has been noted, when the stepper arm 72 reaches the contact following the last watering circuit, the stepper relay is reset by reset coil 94. Energization of coil 94 opens wipe-back switch 110 while the stepper arm is being returned to the zero position. This prevents arcing on the various contacts during reset, and prevents the application of short pulses to the various valve solenoids as the system returns to its initial condition. At the same time, latching switch 34 is latched open by the reset coil, where it remains until a first step pulse in a subsequent operational cycle is applied to the master coil 56 to move the stepping arm to position 1. Opening of switch 34 de-energizes the watering timer 30.

Selection interrupter switch 114 is operated by the main stepping coil 56, and opens while this coil is energized, thereby opening the circuit through the stepping relay contacts each time arm 72 is to be stepped. This switch then recloses after arm 72 has reached its next position contact and coil 56 is released; therefore, contact 114 makes and breaks the load current instead of arm 72. This prevents arcing across the contacts and between the selector arm and the contacts, thus permitting a much larger current to be controlled by the stepping relay, while extending the life of the relay. Wipe-back switch 110 also serves to extend the life of the stepping relay; thus, heavy duty contacts may be sacrificed to lengthen the life of the system.

The program selector switches 100, 120 and 130 are operated by means of a program selector solenoid 140 which, through a mechanical connection 142, simultaneously switches the several selectors between their upper and lower positions. This switching is done under the control of program timer 40 which is synchronized with the master timer 22 to permit a change of the watering program between cycles of operation. Thus, for a first cycle of operation controlled by master timer 22, the program selector switches may be in the upper positions illustrated, whereby energization of solenoids V1, V2 . . . VX is controlled by the condition of corresponding control switches 104, 124 . . . 134. At the end of the cycle, when timing switch 46 is opened by the master timer 22, program timer 40 may, through cam 44, close switch 144 to energize coil 140. This will switch all of the program selector switches 100, 120 and 130 to their lower positions, whereby the energization of solenoid valves V1, V2 and VX will be regulated by control switches 108, 128 . . . 138, respectively. Normally, cam 44 will be arranged to hold switch 144 closed for the duration of the second cycle of operation, and, after the reopening of timing switch 46 upon conclusion of the second cycle, will itself open switch 144 to return the program selectors to their initial position. Although the illustrated program selectors are shown as operating between two positions, thereby limiting the selection to two watering programs, it will be apparent that additional watering programs may be provided through the use of, for example, a stepping relay in place of coil 140 with a plurality of contact positions for each of the program selector switches. Each such contact position would, of course, be provided with a separate program control switch such as switches 104 and 108, to provide additional variety in the program selection.

Manual override switches are provided for many of the functions of the present system to increase the flexibility of the system. Thus, a manual stepper advance switch 150 is provided in series with master coil 56 to permit manual stepping of arm 72 when timing switch 46 is closed. Manual reset switch 152 is connected between transformer 18 and reset coil 94 by way of line 154 to permit manual reset of the stepping relay at any point in the sequence. Finally, each of the solenoid valves V1, V2 and VX are provided with manual override control switches 156, 158 and 160, respectively, which are connected to the transformer by way of lines 162 and 154. Closure of any one of these latter manual override control switches permits energization of the corresponding solenoid valves regardless of the operation of the stepping relay.

Energization of any one of solenoids V1, V2 or VX illuminates a corresponding indicator lamp 170, 172 or 174 which are connected in parallel with the respective solenoid valves by way of the program control switches and thence through line 176. In addition, an indicator lamp 178 is connected to stepping relay position 1 to indicate proper operation of the stepping relay at the beginning of the automatic system operation.

To operate the system, the master on-off switch 12 is closed, lighting indicator lamp 20. The various manual override control switches may then be operated to test the valve solenoids and their associated watering circuits. The automatic circuit switch 50 may then be closed, permitting the master timer 22 to energize master coil 56 through the closure of timing switch 46. This steps the main stepping relay to its first position, unlatching switch 34 and permitting energization of pulsing timer 30. If the operating tabs 90 on cam 36 are not set to close switch 92, then the operation of the main stepping relay may be tested through the use of manual advance switch 50, permitting the relay to be stepped through its various positions and then automatically reset. However, before closing automatic circuit switch 50, the pulsing timer normally is set, by means of tabs such as that indicated at 90, to produce a series of pulses through main relay coil 56 in accordance with the time duration each valve is to remain energized. For example, if timer 30 rotates once in twelve minutes, a single shoulder, or tab, 90 will produce a single pulse every twelve minutes; thus, arm 72 will move from one position to the next every twelve minutes. Additional tabs may be used to set the stepping sequence at one minute intervals, six minute intervals, or any other desired rate. It is possible, with this system, to provide a stepping rate of as little as six seconds. By extending the shoulder portion 90 around the circumference of cam 36, switch contact 92 can be held closed for a period of time, and since energization of coil 56 operates to open contact 114, no current will flow through a valve solenoid while switch 92 is closed. Thus, if it is desired to step arm 72 every eleven minutes, shoulder portion 90 could be made to extend so as to hold switch 92 closed for one minute. At the end of this one minute, switch 114 would close to permit current to flow through arm 72 to the selected solenoid valve. Thus, any number of combinations of time durations can be provided by this system.

The time each valve solenoid is set to be on depends upon the amount of water desired. If it takes six minutes to water a bench or a section of plants, taking into account the water flow that can be handled by the valve solenoid and a fertilizer injector if one is used, then cam 36 is set for six minute intervals.

Also prior to energization of the system, the various program control switches are set to energize corresponding valve solenoids in the various program sequences. Thus, for the first cycle of operation, selected ones of switches 104, 124, 134 are closed so that their respective solenoid valves will be energized when stepper arm 72 moves to the appropriate position. Similarly, selected ones of control switches 108, 128 and 138 are closed to permit energization of their corresponding valve solenoids in a subsequent cycle of operation, when coil 140 is energized. Additional program control switches, if provided, are similarly set so that the desired watering programs can be attained. Finally, program timer 40 is set to operate the program selector switches in synchronization with the operation of master timer 22. Then, upon energization of the automatic system, master timer 22 initiates operation of the system by moving the stepping relay to position 1. Pulsing timer 30 then begins to produce the pulses which step the relay arm 72 through its various contacts until it is reset by coil 94. Master timer 22 then de-energizes the control system and program timer 40 changes the program. Subsequently, master timer 22 re-energizes the automatic system and the sequence is repeated, following the second selected watering program.

Thus, there has been described an automatic program control system for greenhouse irrigation systems suitable for use with small diameter plastic tube type systems used with potted plants or for bed watering systems of ornamental or vegetable plants and for hydroponic applications. The system is also adaptable to short cycle "misting" irrigation utilizing overhead irrigators which serve to wet the leaves of the plants to raise the humidity and cool the microclimate at plant level. In such short cycle misting, each circuit is normally on for about a minute every thirty minutes or an hour through the hot part of the day, and about once every two or three hours in the early daylight hours and late in the evening. By proper adjustment of the various timing and pulsing clocks, the present system is capable of automatically meeting the requirements of this type of system.

In a preferred embodiment of the invention, the various control switches, manual override switches and automatic program selector and control switches are mounted on a control panel remote from the valve solenoids being controlled, thus permitting a convenient operation of large and complex systems. In this manner, two or more entirely separate and distinct programs of watering may be set up to permit operation in accordance with known temperature and humidity changes during the course of a day. Although rotary timing motors have been shown in the present embodiment, it will be apparent that the invention is not limited thereto but that equivalent timing devices may be used. Similarly, pulsing and stepping devices or circuits other than those illustrated may be used in the described system, as will be apparent to those skilled in the art. However, the scope of the invention is not limited to the specific embodiment or the suggested modifications described herein, but includes the various alternatives and changes that fall within the true spirit and scope of the invention as defined by the following claims.

I claim:

1. In an automatic irrigation system for supplying selected quantities of water to selected plants at predetermined times and for selected durations,
   a master timing motor, a master timing cam, and a timing switch, said master timing motor driving said master timing cam for periodically closing said timing switch to initiate a cycle of operation of said system at said predetermined times;
   a plurality of controlled watering circuits for applying water to associated plants;
   pulser means for selecting each of said watering circuits sequentially once in each cycle of operation, said pulser means including pulse generating means and a stepping switch means having a plurality of positions corresponding to said plurality of watering circuits;
   said stepping switch including a main stepping coil and an auxiliary stepping coil, said main stepping coil being responsive to closure of said timing switch at the beginning of a cycle of operation to produce a first step to energize said auxiliary stepping coil, de-energize said main stepping coil and transfer control of said stepping switch means to said pulse generating means;
   said pulse generating means comprising means for periodically energizing said main stepping coil to produce subsequent steps in said stepping switch means, said subsequent steps sequentially selecting each of said watering circuits;
   first and second program control means for controlling energization of the selected watering circuits, said first program control means providing a first watering program for all of said watering circuits, and said second program control means providing a second watering program for all of said watering circuits;
   program selector means for each of said watering circuits, whereby one of said first and second watering programs can be selected in each of said watering circuits; and
   reset means for said stepping switch means, said reset means being energized by said stepping switch means after the last of said plurality of watering circuits has been selected to return said stepping switch means to its initial position, said master timing cam thereafter opening said timing switch to end said cycle of operation.

2. The automatic irrigation system of claim 1, wherein each watering circuit includes a solenoid valve which, when energized, supplies water to its corresponding watering circuit for application to associated plants; said first and said second program control means for each watering circuit comprising first and second switch means; said program selector means for each watering circuit comprising third switch means for connecting either said first or said second switch means between a source of electrical power and said solenoid valve when said watering circuit is selected by said pulser means.

3. The automatic irrigation system of claim 2, wherein said program selector further includes relay means responsive to said program timer for simultaneously shifting said third switch means in each of said watering circuits.

4. The automatic irrigation system of claim 1, wherein said pulse generating means comprises a pulsing switch, a pulsing timer motor, and a watering circuit cam driven by said pulsing timer motor to close said pulsing switch periodically, said pulsing switch being in series circuit with said main stepping coil, whereby said stepping switch means is stepped to advance one position each time said pulsing switch is closed.

5. The automatic irrigation system of claim 4, wherein the rate at which said pulsing switch is opened and closed by said watering circuit cam regulates the duration of energization of a selected watering circuit.

6. The automatic irrigation system of claim 4, further including means for energizing said program selector means, whereby one of said first and second watering programs can be selected.

7. The automatic irrigation system of claim 6, wherein said means for energizing said program selector means includes a program timer synchronized with said master timing motor, whereby said first watering program is followed during a first cycle of operation and said second watering program is followed during a subsequent cycle of operation.

8. The automatic irrigation system of claim 7, wherein said stepping switch means comprises a contact at each of said positions, and movable contact arm means responsive to each energization of said main stepping coil to move from one contact to the next adjacent contact, said movable arm being connected in series with said timing switch for energization of the watering circuit corresponding to the selected contact.

9. The automatic irrigation system of claim 8, further including interrupter switch means in series with said contact arm to prevent arcing at said contacts during movement of said contact arm.

10. The automatic irrigation system of claim 8, further including wipeback switch means responsive to said reset means to prevent arcing at said contacts during return of the contact arm of said stepping switch means to its initial position at the end of said cycle of operation.

11. The automatic irrigation system of claim 8, further including manual control override means for each of said watering circuits.

12. The automatic irrigation system of claim 8, further including manual reset and manual advance means for said switch means.

References Cited

UNITED STATES PATENTS

| | | | |
|---|---|---|---|
| 3,118,606 | 1/1964 | Rotunda | 239—70 XR |
| 3,140,720 | 7/1964 | Griswold | 137—624.12 XR |
| 3,440,434 | 4/1969 | Yates et al. | 239—70 XR |

ROBERT G. NILSON, Primary Examiner

U.S. Cl. X.R.

137—624.15, 624.2; 239—66, 70

UNITED STATES PATENT OFFICE
CERTIFICATE OF CORRECTION

Patent No. 3,524,471      Dated Aug. 18, 1970

Inventor(s) Henry W. Bresser

It is certified that error appears in the above-identified patent and that said Letters Patent are hereby corrected as shown below:

Claim 12, line 3, insert --stepping-- before "switch".

SIGNED AND
SEALED
OCT 20 1970

(SEAL)
Attest:

Edward M. Fletcher, Jr.
Attesting Officer

WILLIAM E. SCHUYLER, JR.
Commissioner of Patents